United States Patent [19]
Martinez

[11] 4,025,160
[45] May 24, 1977

[54] DUAL PURPOSE PROJECTION SCREEN

[75] Inventor: Eugene Martinez, Irvington-on-Hudson, N.Y.

[73] Assignee: Robert H. Reibel, Croton-on-Hudson, N.Y. ; a part interst

[22] Filed: Oct. 9, 1974

[21] Appl. No.: 513,348

Related U.S. Application Data

[63] Continuation-in-part of Ser. No. 398,883, Sept. 19, 1973, Pat. No. 3,844,644.

[52] U.S. Cl. ............................................. 350/117
[51] Int. Cl.² ........................................ G03B 21/60
[58] Field of Search .......... 350/117, 124, 126, 127, 350/128, 129; 161/214, 216

[56] References Cited
UNITED STATES PATENTS

| | | | |
|---|---|---|---|
| 1,892,215 | 12/1932 | Mathieu | 333/81 R |
| 2,811,695 | 10/1957 | Drexler | 333/81 R |
| 3,314,742 | 4/1967 | Morgan | 350/117 |
| 3,507,548 | 4/1970 | Hoffmann et al. | 350/117 |
| 3,653,740 | 4/1972 | Ogura et al. | 350/117 |
| 3,726,583 | 4/1973 | Fujisaki et al. | 350/126 |
| 3,751,135 | 8/1973 | Clausen et al. | 350/126 |
| 3,778,563 | 12/1973 | Bise et al. | 179/170 R |
| 3,796,945 | 3/1974 | Feldman et al. | 323/74 |
| 3,811,750 | 5/1974 | Coulthard | 350/129 |
| 3,858,128 | 12/1974 | Mullin | 323/80 |
| 3,883,682 | 5/1975 | Cagle et al. | 74/68.5 |

*Primary Examiner*—L. T. Hix
*Assistant Examiner*—Alan Mathews
*Attorney, Agent, or Firm*—J. B. Felshin

[57] ABSTRACT

This application embodies a dual purpose projection screen comprising a layer of milky white, translucent, flexible plastic film, coated on one side with a layer of reflecting metal, and a layer of flexible, white opaque material covering the metal reflecting layer. This screen serves as a high gain reflection screen for rays projected against the exposed side of the translucent film, with such rays passing through said translucent film and being reflected back by the metal layer, and as a standard reflecting screen for rays projected against the exposed side of the opaque layer, with said exposed side acting as the reflecting surface for such rays. Said opaque layer also acts as a backing or strengthening layer for the screen to enhance the strength, handling and mounting of the screen on a frame. This screen can be embossed with fine lines running in the same direction in a pattern, to resemble brushed silk.

11 Claims, 9 Drawing Figures

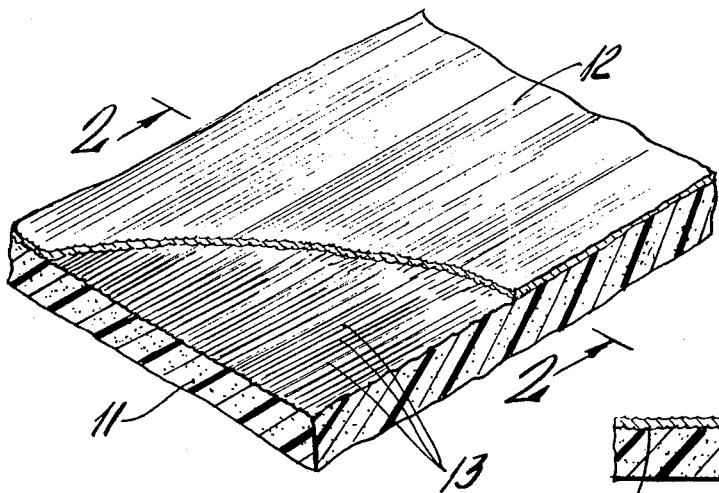
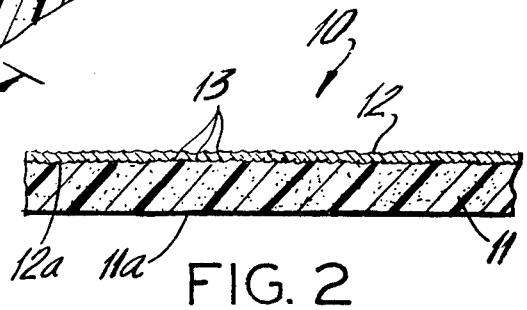
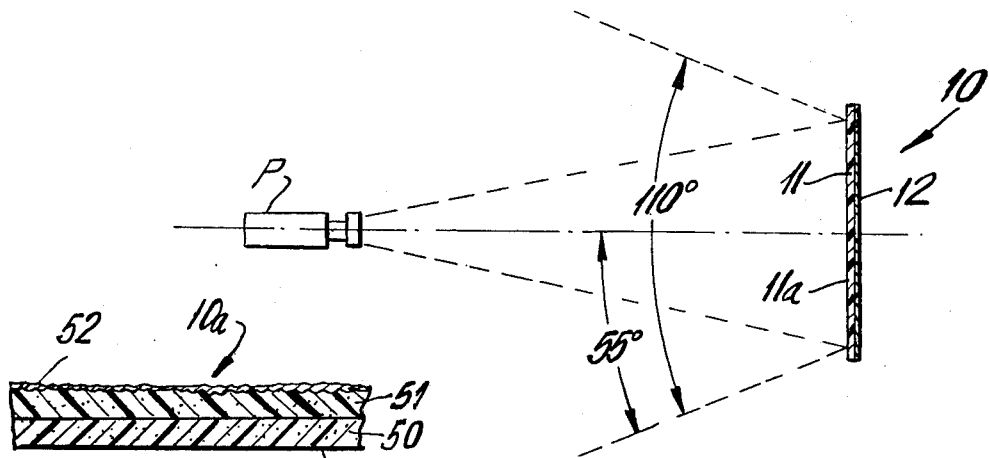
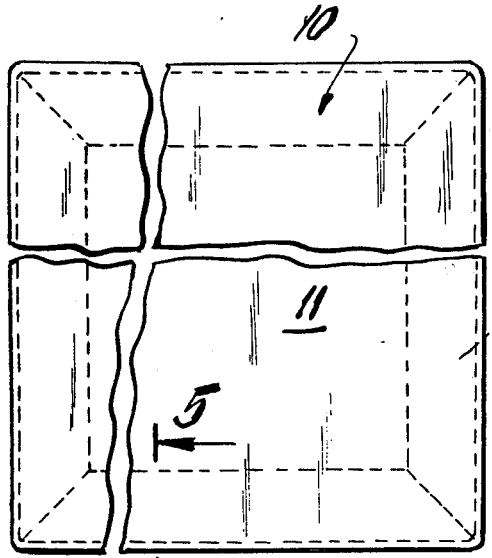
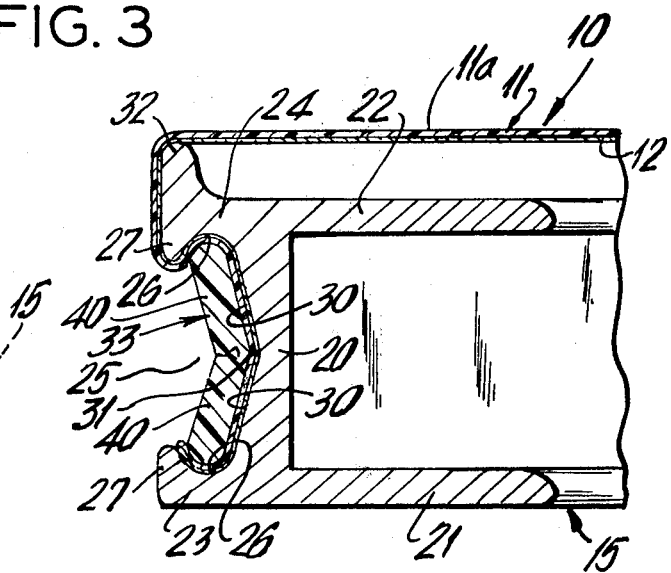
FIG.1
FIG. 2
FIG.6
FIG. 3
FIG. 4
FIG.5

DUAL PURPOSE PROJECTION SCREEN

This application is a continuation in part of my application Ser. No. 398,883 filed Sept. 19, 1973 for PROJECTION SCREEN, now U.S. Pat. No. 3,844,644.

This invention relates to high gain, lenticular photographic projection screens.

The earliest projection screen was probably a wall, preferably painted flat white. Then came the bed sheet (before the age of wild decorator patterns) hung over the wall now covered with flowered wallpaper. Of course, stretching the bed sheet to get rid of wrinkles became the next problem. Ergo, there came into being a canvas screen laced and stretched on a pipe frame.

The image has always been formed on a screen by the projector. Thus it is the final link in the optical projection chain. The white part of the picture is formed by light projected on the screen, the dark part of the picture, by the absence of light in the room. Obviously, the darker the room the more contrast the picture will have.

Total darkness being difficult to achieve, even in a theater, the inventive mind set to work seeking a better screen surface; one that would reflect more of the projected light and retain high contrast or better blacks, whites and intense colors. There then came into being the famous silver screen of Hollywood's heyday.

So we had screens in the form of a white or silver fabric stretched for flatness or a not so flat, but convenient for storage, as a roll up screen.

The white screen was then improved by adding tiny glass beads to its surface and this improved its "gain" or light reflecting efficiency by 2 to 10 times over a matte white surface. Unfortunately, the glass beads give the picture a "grainy" soft focus effect; the adhesive used to hold the beads to the fabric will oxidize in time and yellow the screen; the beads fall off and finally being white, it is still dependent on room darkness for an image rich in contrast and color. As the light level in the room increases, the image on the screen washes out.

The silver lenticular screen is the next step in the evolution of screens. Here a silvered surface is corrugated for the purpose of horizontally expanding the reflected cone of light and silvered to improve image contrast as the ambient light level is increased. The gain of a lenticular screen is approximately 2 – 4 times.

The lenticular screen manages to produce a fairly good image in a room with sufficient light to wash out the image on a white or beaded screen, in spite of its comparatively low gain factor which requires a higher wattage projector. However, it has two significant drawbacks (in addition to requiring higher wattage for equivalent image brightness) and these are: The lenticular effect adds vertical lines all over the projected image and reduces image sharpness; the screen material must be kept as flat as possible (a difficult feat with a roll-up screen).

Screens are also known in which a clear plastic film is striated on a front surface on which surface metallized reflecting coating is vacuum deposited. The exposed surface of the deposited metallized coating is then printed with a pigmented solution. This pigmented solution dries and forms a thin layer on which the picture is reflected. The exposed surface of the metallized layer which forms the reflecting surface is not as sharp as the opposite surface thereof which faithfully follows the striations of the plastic film. The printed layer does not present a flat surface.

This brings us to the current state of the art. We know that a matte, flat surface forms the best, sharpest image (definition). We know that a highly reflective mirror surface returns the most amount of reflected light (contrast) and that a lenticular effect expands the cone of reflected light in the horizontal plane while reducing it in a vertical plane (efficiency).

Using this knowledge, the present high gain front projection screens were developed.

It is hence an object of the present invention to obviate difficulties encountered with previous screens.

Another object of this invention is to provide a highly improved projection screen material for use as a front surface projection screen.

This is a material developed for use as a front surface projection screen. It consists of three elements: the first being a milky white translucent plastic film, the second being very fine "hairline" striations on the back surface (that which is opposite the surface nearest to the projection source) of the film in a random pattern evenly covering the entire surface and the third element is a highly reflective metallized coating (vacuum plated aluminum) on the back surface. The purpose of the first element is to provide a matte white surface on which an image can be formed by the light projected onto it from the projection source. The fact that it is translucent rather than opaque allows the second and third elements to function as follows. The striations on the back surface of the film serve to disperse the reflected cone of light in a wide horizontal angle (approximately 110°) and a narrow vertical angle (approximately 30°). The purpose of the reflective coating on the back surface is to return the rays as if the film were an opaque white material. The screen material can be used in a number of different ways such as the traditional roll-up screens, grommeted along the edges and laced to a frame made of tubing or utilizing any suitable rigid frame that holds the screen on a flat panel presenting a soft flat surface (if you push it with a finger, it dimples and returns to flat). It is desirable that in use the screen be kept as flat as possible in order to provide an undistorted projection surface.

A further object of this invention is to provide a dual purpose projection screen of the character described having high gain reflecting means on one side thereof and standard gain reflecting means on the other side thereof.

Yet a further object of this invention is to provide a projecting screen of the character described which has a milky white translucent flexible layer exposed on one side, coated with metallized reflecting material at its other side, and a layer of white opaque flexible material bonded to the reflecting coating.

Still a further object of this invention is to provide a screen of the character described which is embossed with fine lines or grooves running in the same direction.

A still further object of this invention is to provide a screen of the character described in which said white opaque material is a matte (flat) white sheet of vinyl plastic that is bonded to the metal reflecting coating by adhesive, said vinyl layer acting to strengther the metal coated milky white translucent sheet in addition to providing a standard gain reflecting screen surface to the screen.

A further object of this invention is to provide a durable screen of the character described which shall be inexpensive to manufacture, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims:

IN THE DRAWINGS

FIG. 1 is a greatly enlarged general view of a portion of a screen of this invention:

FIG. 2 is a sectional view taken along line 2—2 of FIG. 1;

FIG 3 is a schematic plan view depicting a projector with a screen of this invention;

FIG. 4 is a front elevational view of the projection screen of this invention with a frame support;

FIG. 5 is an enlarged sectional view taken along line 5—5 of FIG. 4:

FIG. 6 is a partial cross-sectional view of a modified form of screen material;

Figure 7:
FIG. 7 is a cross-sectional view of a dual purpose screen embodying a modification of the invention.

Referring now to FIGS. 1 and 2, there is shown the projection screen generally designated 10. Projection screen 10 comprises a thin translucent milky white plastic film 11 having a front surface 11a and formed on the rear surface thereof with fine parallel random striations 13, and having a backing of a highly reflective metallized coating 12 on said striated surface. The striations may be mechanically formed by the rotating action of a wire or bristle brush (not shown) moving against and across the rear surface of the film. As can be seen, the metallized coating fills the fine crevices of the striations and so achieves a striated front surface 12a which faithfully follows the striations in the film 11. The metallized coating 12 is unbacked.

Referring now to FIG. 3 there is shown the projection screen 10 in facing relationship with a projector P. The front surface 11a of the plastic film 11 first receives the image-forming light from the projector P, which light passes through the film 11, is reflected in a lenticular manner by the vertically disposed parallel striations of the front surface 12a of the metallized coating. The image-forming light is thereby reflected back into the plastic film and carried therein during projection for viewing by an audience disposed in front of the screen.

The angle of viewing achieved by the projection screen is, as a result of the lenticular effect, increased in the horizontal plane relative to the central axis of the projector P. This expanded angle of reflection in the horizontal plane as opposed to the vertical plane provides for greater wide angle viewing by an audience.

Referring to FIGS. 4 and 5, there is shown, for purpose of illustration, the projection screen 10 mounted on a frame support generally shown at 15. Such frame support is the one shown and described in U.S. Pat. No. 3,757,479, issued Sept. 11, 1973.

The frame shown in the drawing is rectangular in shape, with the major dimension being along the horizontal plane. Said frame has an outer transverse wall 20 from which two flanges 21, 22 extend in parallel relation. Flange 21 will be at the rear of the frame 15 while flange 22 will be at the front of the frame. Extending outwardly from transverse wall 20 is a wall 23 aligned with flange 21, and a wall 24 aligned with flange 22. Between walls 23, 24 is formed a groove 25 having side undercuts 26 to provide overhang portions 27 extending from walls 23, 24 overlying the groove. At the bottom of groove 25 (or at top of transverse wall 20) is a wide V-shaped surface formed with inclined covering surface portions 30 meeting in a longitudinal apex 31. The undercuts 26 are semi-cylindrical in shape and merge with the inclined surfaces 30. Extending from wall 24 is an overhang ledge 32.

Strip 33 for attaching screen 10 to frame 15, is made of flexible, resilient compressible synthetic plastic or rubber. Said strip is a single continuous strip of proper length to go all around the frame.

Wings 40 of said flexible strip 33 will press the film down into surfaces 30 and into contact with the internal undercut surfaces 26. The strip then has a toggle action and cannot become loose because to come out of the groove, the strip 33 would have to substantially increase in width as the strip flattens. Also it should be noted that the normal width of the strip when fully in the groove, as shown in FIG. 5, is not compressed would be greater than the normal width, when the strip is not in the groove. This is so because the strip is flatter when in the groove than in normal unflexed inverted V-shape. The flatter the strip is, the wider it is. Hence the strip is in compression because it is flatter in the groove than when it is in normal unconstricted condition. The shallower inclined surfaces 30 prevent the strip from becoming narrower and prevent increasing its angularity when in the grooved. The front surface 11a of the screen faces the projector P. The part of the screen stretched by the frame provides a flat soft panel as shown at the top of FIG. 5, between the ledges 32 of the frame.

It has been found that the translucent plastic film 11 having a degree of light transmission of from about 60 percent to about 75 percent, when backed with appearance highly reflective metallized coating, provides a suitable projection screen.

The degree of light transmission is determined by situating a light source at a fixed distance from a photometer and measuring the luminescence. This first measurement is considered a 100 percent degree of transmission insofar as there is no interposed medium, save for the ambient air, so as to diminish the illumination. Then a translucent plastic film is placed at a specific distance between the aforesaid light source and photometer, and a second reading is taken of the luminescence registered by the photometer. Then a ratio is calculated of the degree of light transmission. Obviously an opaque film would give a zero degree of light transmission.

It has been further found that when the light transmission percentage decreases to below about 60 percent, the degree of reflectivity from the metal backing is diminished to a point wherein the screen cannot be said to be suitably operable. At the higher side of the scale, when the degree of light transmission exceeds about 75 percent there is noticed that while the reflectivity is high, there is a significant loss in the picture forming qualities of the film. A transparent film employed as a screen would not be operable, as such, but would be in effect a mirror merely reflecting the image rather than retaining the image for projection. Further at the high degrees of light transmission "hot-spots" are formed in the film.

The translucent plastic films useful according to this invention may be polyesters, such as Melinex Type 337, manufactured by ICI America, Inc. ("Melinex" is a trademark of ICI America, Inc.); Type EB-11 Mylar, manufactured by E.I. Dupont de Nemours, Inc. ("Mylar" is a registered trademark of E. I. Dupont de Nemours Wilmington, Del.); polyvinyls, such as Type 100 BG 15 UW Tedlar, manufactured by E.I. Dupont de Nemours, ("Tedlar" is a trademark of E.I. Dupont de Nemours, Wilmington, Del.); polyamides such as nylon; and the like.

The plastic film thickness may vary and is not narrowly critical. Polymeric film thickness of from about 0.001 to about 0.005 inch are found suitable for the plastic film 11.

The translucent plastic film may be formed by a clear polymer having finely divided, evenly dispensed particulates or pigments. Preferred pigmenting agents are those which provide a milky-white apperance in the formed plastic film. The particulates or pigmenting agents may be incorporated in the film in thermoforming a thermiplastic film.

Suitable reflective backing for coating the one plastic film surface, includes metallized backing such as aluminum and the like. The aluminum may be vacuum deposited on the straited surface of the plastic film.

The striations are formed in the one surface of the plastic film by using a wire or bristle rotating brush. The brush is rotated in relation to the plastic film and moved across the film so that the striations are fine and generally randomly parallel in the vertical direction.

Although the projection screen 10 of this invention may, as stated, be mounted to a frame such as the one described above, it also may be utilized in the conventional roll-up screens grommeted along the edges and laced to a frame made of tubing or mounted in any other way so that the front surface 11a of the film 11 faces the projector and presents a soft panel. In use, it is desirable that the screen be kept as flat as possible in order to provide an undistorted projection surface. In any event, the front surface of the screen panel faces the projector in use as a screen.

The terms "horizontal" and "vertical" as used hereinbefore and hereinafter throughout the specification refer to orientations of the screen surface for convenient and conventional viewing by an audience distribution extending more horizontally than vertically. Therefore in FIG. 3 the plan view depicts the horizontal extent of the screen and the angle of viewing is along the horizontal plane.

In FIG. 6 there is shown a piece of screen material 10a illustrating a modified construction. Said piece of screening material 10a comprises a milky white translucent plastic layer or film 50 laminated to a plastic layer or film 51 which may be clear. The layer 50 has a front flat surface 50a which receives the photographic rays from a photographic projector.

The rear surface of layer 51 is scratched or striated randomly up and down and said surface is covered by vacuum deposited reflective metal such as aluminum. The coating 52 is unbacked. This screen 10a may be used like screen 10 as described above.

The screen 10 can be rigid and self supporting and the metallized reflecting coating could be vacuum deposited with the screen in concave shape, to contrast the reflected cone of light. Also the screen 10 could be adhered to a concave rigid supporting surface if desired.

It will be understood that if desired, the striations may be omitted from the above described screens.

Referring now to FIG. 7, there is shown in screen 60 comprising a layer of film 61 of milky white translucent plastic material similar to material 11 described hereinabove.

Applied to the rear surface of said layer 61 is a layer or coating 62 of reflecting metal, such as aluminum. This reflecting layer can be vacuum deposited or otherwise applied. Bonded to the rear surface of layer 62 as by an adhesive layer 63 is a sheet or layer 64, of flexible, opaque, matte (flat) white vinyl or other suitable opaque plastics or other material.

Layers 61, 62 are flexible. The sheet or layer 64 is also flexible and acts as a strengthening backing for layers 61, 62. The layers 61, 62 act as a high gain reflecting screen similar to layers 11, 12 of screen 10 hereinabove. In addition, rays can be projected onto the exposed side of layer 64 to provide a standard gain screen reflecting surface. Thus layer 64 has two functions. It strengthens the screen layers 61, 62 and it provides an additional standard screen surface to the high gain screen constituting layers 61, 62.

Screen layers 61, 62 can be embossed as between corrugated pressure rollers, with fine lines which are substantially straight and parallel to produce a brushed silk or striated effect. The lines could be in a pattern of very fine lines which could be about 0.004 or 0.005 inch deep, and such lines could be about 0.010 inch apart. The lines could be of different lengths or run entirely through the screen all running in vertical directions.

Figure 8:
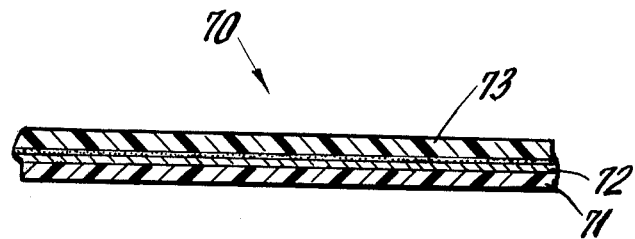
FIG. 8 is a cross-sectional view of another modified form of the invention.

In FIG. 8 the screen 70 comprises a layer or film 71 of flexible milky white translucent plastic film or other material coated with a layer 72 of reflecting metal to which a layer 73 of flexible, white, matte (flat) opaque plastic such as vinyl, is bonded by adhesive or otherwise. This screen 70 functions like screen 60 but does not have embossed striations for lenticular effect but it may have brushed striations.

Figure 9:
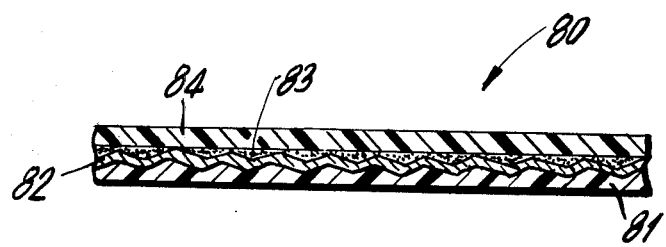
FIG. 9 is a cross-sectional view of still another modified form of the invention.

In FIG. 9 there is shown a screen 80 comprising a milky white translucent flexible film, layer or sheet 81 scratched as by brushing.

Vacuum deposited or otherwise applied to said scratched surface, is a layer 82 of reflecting metal to which is bonded, as by a thin layer 83 of adhesive, a sheet or layer 84 of flexible opaque, matte white vinyl or other plastic or other material.

The bonding of the opaque layer to the metal layer, may be accomplished with heat sensitive adhesive, microscopic or about 0.0005 inch in thickness.

The layers 61, 62 are wavy on both sides. The opaque white layer could be between 0.005 to 0.020 inch in thickness.

The matte (flat) white surface of layers 64, 73, 80 can be achieved by the vinyl sheet itself or by a coating of ink or paint compatible with the vinyl sheet.

The screens 60, 70 or 80 can be mounted on a suitable frame such as 15 shown herein or on a frame that can be turned around to bring either side toward the projector so that either side of any of said screens can be reflectively projected upon.

It will be easy to note which side is the high gain side and which is the standard side of screens 60, 70 or 80 since the high gain side will have a dull metal appearance, because the reflecting metal will show through the milky white translucent layer which is light transmitting, and the standard side is flat white and opaque.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. A dual purpose photographic front projection screen comprising a milky white, translucent, flexible, plastic film having a front, surface to face a projection source, a reflective metal layer on the opposite surface of said film, said film allowing projected rays to pass through said film to be reflected back through the film by the surface of said metal layer adjacent said plastic film, and said film also carrying the image caused by rays passing therethrough while the rays are projected onto said front surface of said film, and a layer of flexible opaque reflective material bonded to the surface of the metal layer remote from said film, said opaque layer providing a strengthening backing for said film and metal layer, and presenting an exposed side serving as a reflecting surface for images projected onto said exposed side of said opaque layer.

2. The combination of claim 1, said opaque layer being white.

3. The combination of claim 1, said opaque layer comprising vinyl.

4. The combination of claim 1, said opaque layer comprising matte white plastics material.

5. The combination of claim 1, said film being embossed with parallel grooves running substantially in the same direction.

6. The combination of claim 1, said metal layer being vacuum deposited on said opposite side of said film.

7. The combination of claim 1, said film being provided with striations on said opposite side thereof, and said metal layer covering said striations.

8. A dual purpose photographic front projection screen comprising a milky white, translucent, flexible, plastic film having one surface to face a projection source, a reflective metal layer on the opposite surface of said film, said film allowing projected rays to pass through said film to be reflected back through the film by the surface of said metal layer adjacent said plastic film, and said film also carrying the image caused by rays passing therethrough while the rays are projected onto said one surface of said film, and a layer of flexible opaque material bonded to the surface of the metal layer remote from said film, said opaque layer providing a strenghening backing for said film and metal layer, and presenting an exposed side serving as a reflecting surface for images projected onto said exposed side of said opaque layer, said film being provided with striations on said opposite side thereof, and said metal layer covering said striations, said metal reflecting layer comprising reflecting metal vacuum deposited on said striated side of said film.

9. The combination of claim 8, said opaque layer being white.

10. The combination of claim 8, said opaque layer comprising vinyl.

11. The combination of claim 8, said opaque layer comprising matte white plastics material.

* * * * *